United States Patent
Maeda et al.

(10) Patent No.: US 9,274,010 B2
(45) Date of Patent: Mar. 1, 2016

(54) CAPACITANCE TYPE SENSOR

(71) Applicant: TOKAI RUBBER INDUSTRIES, LTD., Aichi-ken (JP)

(72) Inventors: Ichinosuke Maeda, Aichi-ken (JP); Tetsuyoshi Shibata, Aichi-ken (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 16 days.

(21) Appl. No.: 14/331,580

(22) Filed: Jul. 15, 2014

(65) Prior Publication Data

US 2014/0326079 A1   Nov. 6, 2014

Related U.S. Application Data

(63) Continuation of application No. PCT/JP2012/083253, filed on Dec. 21, 2012.

(30) Foreign Application Priority Data

Mar. 26, 2012 (JP) .................. 2012-069103

(51) Int. Cl.
*G01L 1/14* (2006.01)

(52) U.S. Cl.
CPC ................. *G01L 1/142* (2013.01); *G01L 1/144* (2013.01); *G01L 1/146* (2013.01)

(58) Field of Classification Search
CPC ......... G01L 1/146; G01L 1/142; G01L 1/205; G01L 1/14; G01L 5/00; G06F 3/044
USPC .................................... 73/862.626
See application file for complete search history.

(56) References Cited

U.S. PATENT DOCUMENTS 4,526,043 A * 7/1985 Boie ..................... G01B 7/004
                                                                    361/283.3
5,010,772 A * 4/1991 Bourland ............... A61B 5/113
                                                                    73/172

(Continued)

FOREIGN PATENT DOCUMENTS

EP    2154503    2/2010
JP    06-029801    4/1994

(Continued)

OTHER PUBLICATIONS

International Preliminary Report on Patentability in PCT/JP2012/083253, dated Oct. 1, 2014, with Written Opinion of the International Searching Authority, English language translation.

(Continued)

*Primary Examiner* — Freddie Kirkland, III
(74) *Attorney, Agent, or Firm* — Greenblum & Bernstein, P.L.C.

(57) ABSTRACT

A capacitance type sensor includes: a dielectric layer made of a polymer; an elongated front-side electrode placed on a front side of the dielectric layer; an elongated back-side electrode placed on a back side of the dielectric layer; a front-side wiring connected to the front-side electrode; a back-side wiring connected to the back-side electrode; and a plurality of detection portions formed between the front-side electrode and the back-side electrode. Each of the front-side electrode and the back-side electrode has an elongated electrode body containing a binder and a conductive material, and an extended wiring portion extending in a longitudinal direction of the electrode body and having lower volume resistivity than the electrode body, and the front-side wiring and the back-side wiring have lower volume resistivity than the electrode body.

9 Claims, 6 Drawing Sheets

(56) References Cited

U.S. PATENT DOCUMENTS

| | | | | |
|---|---|---|---|---|
| 7,538,760 | B2 * | 5/2009 | Hotelling | G06F 3/044 178/18.06 |
| 7,948,477 | B2 * | 5/2011 | Hotelling | G06F 3/0416 345/173 |
| 7,958,789 | B2 * | 6/2011 | Hayakawa | G01B 7/22 73/780 |
| 8,266,971 | B1 * | 9/2012 | Jones | G01L 1/146 73/862.046 |
| 8,314,339 | B2 | 11/2012 | Kitajima et al. | |
| 2010/0033196 | A1 | 2/2010 | Hayakawa et al. | |
| 2013/0082763 | A1 | 4/2013 | Inada et al. | |
| 2014/0210490 | A1 | 7/2014 | Hayakawa et al. | |

FOREIGN PATENT DOCUMENTS

| | | |
|---|---|---|
| JP | 2008-224334 | 9/2008 |
| JP | 2009-59856 | 3/2009 |
| JP | 2010-021371 | 1/2010 |
| JP | 2010-043881 | 2/2010 |
| JP | 2010-153364 | 7/2010 |
| JP | 2011-75322 | 4/2011 |
| JP | 2011-075322 | 4/2011 |
| JP | 2012-073141 | 4/2012 |
| JP | 2012-251896 | 12/2012 |

OTHER PUBLICATIONS

Chinese Office Action in 201280067775, with partial English language translation, dated Mar. 3, 2015.

International Search Report in PCT/JP2012/083253, with English language translation, mailed Jan. 29, 2013.

Extended European Search Report in EP 12873228.6, dated Nov. 20, 2015.

* cited by examiner

CAPACITANCE TYPE SENSOR

CLAIM FOR PRIORITY

This application is a continuation of PCT/JP2012/083253 filed Dec. 21, 2012, and claims the priority benefit of Japanese application 2012-069103, filed Mar. 26, 2012, the contents of which is expressly incorporated by reference herein in its entirety.

TECHNICAL FIELD

The present invention relates to capacitance type sensors capable of detecting surface pressure distribution from a change in capacitance, and more particularly relates to electrodes and wiring structures thereof.

BACKGROUND ART

As disclosed in Patent Document 1, for example, a capacitance type sensor can be configured by placing front-side electrodes and back-side electrodes with a dielectric layer interposed therebetween. A plurality of detection portions are formed between the front-side electrodes and the back-side electrodes which face each other in the front-back direction. When a load is applied to the capacitance type sensor, the thickness of the detection portion corresponding to a part subjected to the load, i.e., the distance between the front-side electrode and the back-side electrode in the part subjected to the load, is reduced, and capacitance of the detection portion is therefore increased. The capacitance type sensor detects surface pressure distribution based on this change in capacitance.

In the capacitance type sensor disclosed in Patent Document 1, the dielectric layer is made of an elastomer. In order not to restrict elastic deformation of the dielectric layer, the front-side electrodes and the back-side electrodes (hereafter sometimes collectively referred to as the "electrodes") are made of conductive paint containing polymer and carbon black corresponding to the amount of elastomer. Front-side wirings and back-side wirings (hereinafter sometimes collectively referred to as the "wirings") are made of conductive paint containing polymer and silver powder corresponding to the amount of elastomer, in order for the front-side wirings and the back-side wirings to have lower electrical resistance than the electrodes.

RELATED ART DOCUMENTS

Patent Documents

[Patent Document 1] Japanese Patent Application Publication No. 2010-43881 (JP 2010-43881 A)
[Patent Document 2] Japanese Patent Application Publication No. 2010-21371 (JP 2010-21371 A)
[Patent Document 3] Japanese Examined Patent Application Publication No. H06-29801 (JP H06-29801 B)
[Patent Document 4] Japanese Patent Application Publication No. 2008-224334 (JP 2008-224334 A)

SUMMARY OF THE INVENTION

Problem to be Solved by the Invention

Electrical resistance of an object is calculated by the following expression (1).

$$r = \rho L/S \tag{1}$$

In the expression (1), r represents electrical resistance, $\rho$ represents volume resistivity, L represents length, and S represents sectional area (thickness by width). As can be seen from the expression (1), if the sectional area is constant, the electrical resistance r increases as the length L of the object increases. In the above capacitance type sensor, the electrodes have a strip shape. Accordingly, in the case where the wirings are connected to one ends in the longitudinal direction of the electrodes, the electrodes have higher electrical resistance as farther from their connection portions to the wirings, that is, closer to the other ends in the longitudinal direction. Such variation in electrical resistance of the electrodes causes variation in capacitance, resulting in position dependence. Namely, measurement accuracy of the surface pressure distribution varies depending on the position of the detection portion.

Carbon black has higher volume resistivity as compared to metals such as silver. Accordingly, forming the electrodes from conductive paint containing carbon black increases the amount of increase in electrical resistance of the electrodes according to the distance from their connection portions to the wirings. Accordingly, the problem of not being able to accurately detect capacitance in the detection portions located on the downstream side, namely located far from their connection portions to the wirings, becomes more pronounced. Silver paste containing silver powder and a binder is known as a wiring material. Wirings that are made of silver paste have low electrical resistance. Accordingly, if the electrodes are made of silver paste, an increase in electrical resistance in the longitudinal direction is reduced. However, since silver paste is more expensive than carbon black, forming the electrodes occupying a large area from silver paste increases cost.

The present invention was developed in view of the above situations, and it is an object of the present invention to provide a capacitance type planar sensor that suppresses an increase in electrical resistance in the longitudinal direction of electrodes, that is relatively inexpensive, and that has high measurement accuracy of surface pressure distribution.

Means for Solving the Problem (1) In order to solve the above problem, a capacitance type sensor according to the present invention includes: a dielectric layer made of a polymer; an elongated front-side electrode placed on a front side of the dielectric layer; an elongated back-side electrode placed on a back side of the dielectric layer; a front-side wiring connected to the front-side electrode; a back-side wiring connected to the back-side electrode; and a plurality of detection portions formed between the front-side electrode and the back-side electrode which face each other in a front-back direction. The capacitance type sensor is capable of detecting surface pressure distribution based on a change in capacitance of the detection portion, and is characterized in that each of the front-side electrode and the back-side electrode has an elongated electrode body containing a binder and a conductive material, and an extended wiring portion extending in a longitudinal direction of the electrode body and having lower volume resistivity than the electrode body, and the front-side wiring and the back-side wiring have lower volume resistivity than the electrode body.

In the capacitance type sensor of the present invention, each of the front-side electrode and the back-side electrode has the elongated electrode body and the extended wiring portion. The extended wiring portion has lower volume resistivity than the electrode body, and is placed so as to extend in the longitudinal direction of the electrode body. Since the electrode is formed by the electrode body and the extended wiring portion, an increase in electrical resistance in the longitudinal direction of the electrode can be suppressed and the overall electrical resistance of the electrode can be reduced as compared to the case where the electrode is formed only by the electrode body. In the capacitance type sensor of the present invention, the capacitance does not vary so much depending on the position of the detection portion, and high measuring accuracy of the surface pressure distribution can be achieved.

In the capacitance type sensor of the present invention, even if relatively inexpensive conductive carbon powder is used as the conductive material of the electrode body, a highly conductive electrode with a small increase in electrical resistance in the longitudinal direction can be implemented. Accordingly, the capacitance type sensor of the present invention can be manufactured relatively inexpensively.

Patent Document 3 discloses a wiring board in which wirings made of silver paste are coated with a protective film made of conductive paste containing carbon powder. However, what is disclosed in Patent Document 3 is a technique of the wiring board. That is, the technique disclosed in Patent Document 3 merely ensures insulation properties between adjoining wirings by suppressing migration of the silver wirings by coating the silver wirings with the protective film. Accordingly, Patent Document 3 does not include the idea of suppressing an increase in electrical resistance in the longitudinal direction of the electrode. Patent Documents 4 and 5 disclose a pressure sensor including a pair of opposing electrodes. A silver electrode covered by a carbon electrode is disclosed as the electrode. The carbon electrode merely serves as a protective film for the silver electrode. Accordingly, Patent Documents 4 and 5 do not include the idea of suppressing an increase in electrical resistance in the longitudinal direction of the electrode.

(2) Preferably, in the configuration of (1), the extended wiring portion of the front-side electrode and the front-side wiring are made of the same material such that the extended wiring portion of the front-side electrode is continuous with the front-side wiring, and the extended wiring portion of the back-side electrode and the back-side wiring are made of the same material such that the extended wiring portion of the back-side electrode is continuous with the back-side wiring.

The extended wiring portions of the front-side electrode and the back-side electrode, the front-side wiring, and the back-side wiring have lower volume resistivity than the electrode body. The extended wiring portions can therefore be made of the same material as the front-side wiring and the back-side wiring. According to this configuration, the extended wiring portions can be easily formed by merely extending the front-side wiring and the back-side wiring in the longitudinal direction of the electrode body.

(3) Preferably, in the configuration of (1) or (2), the binder of the electrode body is a resin.

The electrode body contains the binder and the conductive material. A resin or elastomer (cross-linked rubber and thermoplastic elastomer) can be used as the binder. Conductive carbon powder such as carbon black or graphite powder, or metal powder such as silver or copper can be used as the conductive material. In this configuration, a resin is used as the binder. Resins are advantageous over elastomers in that they are less likely to lose resilience and has higher whether resistance and higher printing characteristics. Moreover, forming the electrode body from a resin is also advantageous in that the electrical resistance does not change so much with time.

(4) Preferably, in the configuration of any one of (1) to (3), the volume resistivity of the electrode body is $1 \times 10^1$ Ω·cm or less.

In this configuration, since the volume resistivity of the electrode body is relatively low, an increase in electrical resistance in a direction crossing the longitudinal direction of the electrode body need not be considered. Accordingly, the overall electrical resistance of the electrode can be reduced by merely forming the extended wiring portion along the longitudinal direction of the electrode body.

(5) Preferably, in the configuration of any one of (1) to (4), the extended wiring portion contains a binder and metal powder.

Metals typically have low volume resistivity. Therefore, according to this configuration, the extended wiring portion having lower volume resistivity than the electrode body can be easily formed. The use of the conductive paint containing the binder and the metal powder allows a thin film-like extended wiring portion to be easily formed in various patterns by using a printing method etc.

One or more kinds of powder selected from silver, gold, copper, nickel, rhodium, palladium, chromium, titanium, platinum, iron, and their alloys can be used as the metal powder. Powder of particles covered with a metal such as silver-coated copper power may be used as the metal powder. Either one kind of metal powder or a mixture of two or more kinds of powder may be used as the metal powder. In particular, silver is preferable as it has low volume resistivity. Accordingly, silver powder, silver-coated copper powder, or silver-alloy powder can be used as the metal powder.

The volume resistivity of the extended wiring portion need only be lower than that of the electrode body. For example, the volume resistance value of $1 \times 10^{-3}$ Ω·cm or less is preferable because a high effect of improving conductive properties of the electrode can be achieved.

(6) Preferably, in the configuration of any one of (1) to (5), in each of the front-side electrode and the back-side electrode, electrical resistance between an upstream end to which the front-side wiring or the back-side wiring is connected and a downstream end as a longitudinal terminal end is 3,000Ω or less.

According to this configuration, the overall electrical resistance of the elongated electrode can be reduced. This allows a sufficient amount of current to be supplied to the detection portions that are formed between the electrodes far from their connection portions to the wirings, and the capacitance can be measured accurately. Therefore, according to this configuration, variation in capacitance depending on the position of the detection portion is further reduced, and measurement accuracy of the surface pressure distribution is further improved.

(7) Preferably, in the configuration of any one of (1) to (6), the extended wiring portion has a smaller area than the electrode body.

In the case of using expensive metal powder for the extended wiring portion, the usage of metal powder can be reduced as the area of the extended wiring portion is smaller. This can reduce cost, whereby more inexpensive electrodes, and thus a more inexpensive capacitance type sensor can be implemented.

(8) Preferably, in the configuration of any one of (1) to (7), the electrode body and the extended wiring portion are formed by a printing method.

The use of the printing method allows the electrode body and the extended wiring portion to be formed easily even when the electrode body and the extended wiring portion have a small thickness or a large area. In the printing method, it is easy to form a coated portion and a non-coated portion.

Accordingly, the electrode body and the extended wiring portion can be easily formed even if they are thin lines or they have a complicated shape. Examples of the printing method include ink jet printing, flexo printing, gravure printing, screen printing, pad printing, and lithography. The screen printing method is particularly preferable because high viscosity paint can be used and the coating film thickness can be easily adjusted.

(9) Preferably, in the configuration of any one of (1) to (8), the capacitance type sensor further includes: a pair of front-side and back-side sheets that are placed with the dielectric layer interposed therebetween, the front-side electrode is formed on a back surface of the front-side sheet which contacts the dielectric layer, and the extended wiring portion of the front-side electrode is interposed between the electrode body and the front-side sheet, and the back-side electrode is formed on a front surface of the back-side sheet which contacts the dielectric layer, and the extended wiring portion of the back-side electrode is interposed between the electrode body and the back-side sheet.

For example, if the dielectric layer is made of foam of an elastomer or resin, it is difficult to form the electrode directly on both front and back surfaces of the dielectric layer. In this regard, according to this configuration, the front-side electrode and the back-side electrode can be respectively placed on the front and back surfaces of the dielectric layer without the need to form them directly on the dielectric layer. This increases flexibility in selection of the material for the dielectric layer.

In the case where the electrode is directly formed on both front and back surfaces of the dielectric layer, a load is detected by using a change in distance between the electrodes and electrode area which are associated with extension of the dielectric layer upon compression. Accordingly, in order to detect a relatively small load, a soft material (having a smaller elastic modulus) needs to be used for the dielectric layer so that the dielectric layer can be easily deformed. This causes the problem of durability such that the dielectric layer tends to lose resilience etc. In this respect, according to this configuration, the front-side electrode is formed on the front-side sheet, and the back-side electrode is formed on the back-side sheet. Accordingly, a load can be detected based on a change in capacitance associated with a change in distance between the electrodes (thickness of the detection portion). It is therefore easy to detect even a relatively small load.

According to this configuration, the extended wiring portion is interposed between the electrode body and the front-side sheet (or back-side sheet). The extended wiring portion is therefore less likely to be exposed to air. Therefore, even if metal particles are contained in the extended wiring portion, these metal particles are less likely to be oxidized. Accordingly, conductive properties of the extended wiring portion are less likely to be degraded even after a long period of use. That is, according to this configuration, the electrodes have high durability.

(10) Preferably, in the configuration of any one of (1) to (9), the capacitance is measured by an electric charge method or an impedance method.

In the capacitance type sensor of the present invention, an increase in electrical resistance in the longitudinal direction of the electrode is suppressed. Accordingly, a change in amount of electric charge depending on the position of the detection portion is small in, e.g., the electric charge method. High measurement accuracy of surface pressure distribution can therefore be achieved.

DESCRIPTION OF THE REFERENCE NUMERALS

1: Capacitance Type Sensor, 10: Dielectric Layer, 11: Fused Portion 20: Front-Side Sheet, 21: Electrode Body, 22, 22a, 22b: Extended Wiring Portion, 23: Front-Side Connector, 220: Trunk Portion, 221: Branch Portion, 240: Front End, 241: Rear End 30: Back-Side Sheet, 31: Electrode Body, 32: Extended Wiring Portion, 33: Back-Side Connector, 340: Left End, 341: Right End 40: Operation Section 01X to 08X: Front-Side Electrode, 01Y to 08Y: Back-Side Electrode, 01x to 08x: Front-Side Wiring, 01y to 08y Back-Side Wiring, A0101 to A0808: Detection Portion.

MODES FOR CARRYING OUT THE INVENTION

Embodiments of a capacitance type sensor of the present invention will be described below.

First Embodiment

Configuration of Capacitance Type Sensor

Figure 1:
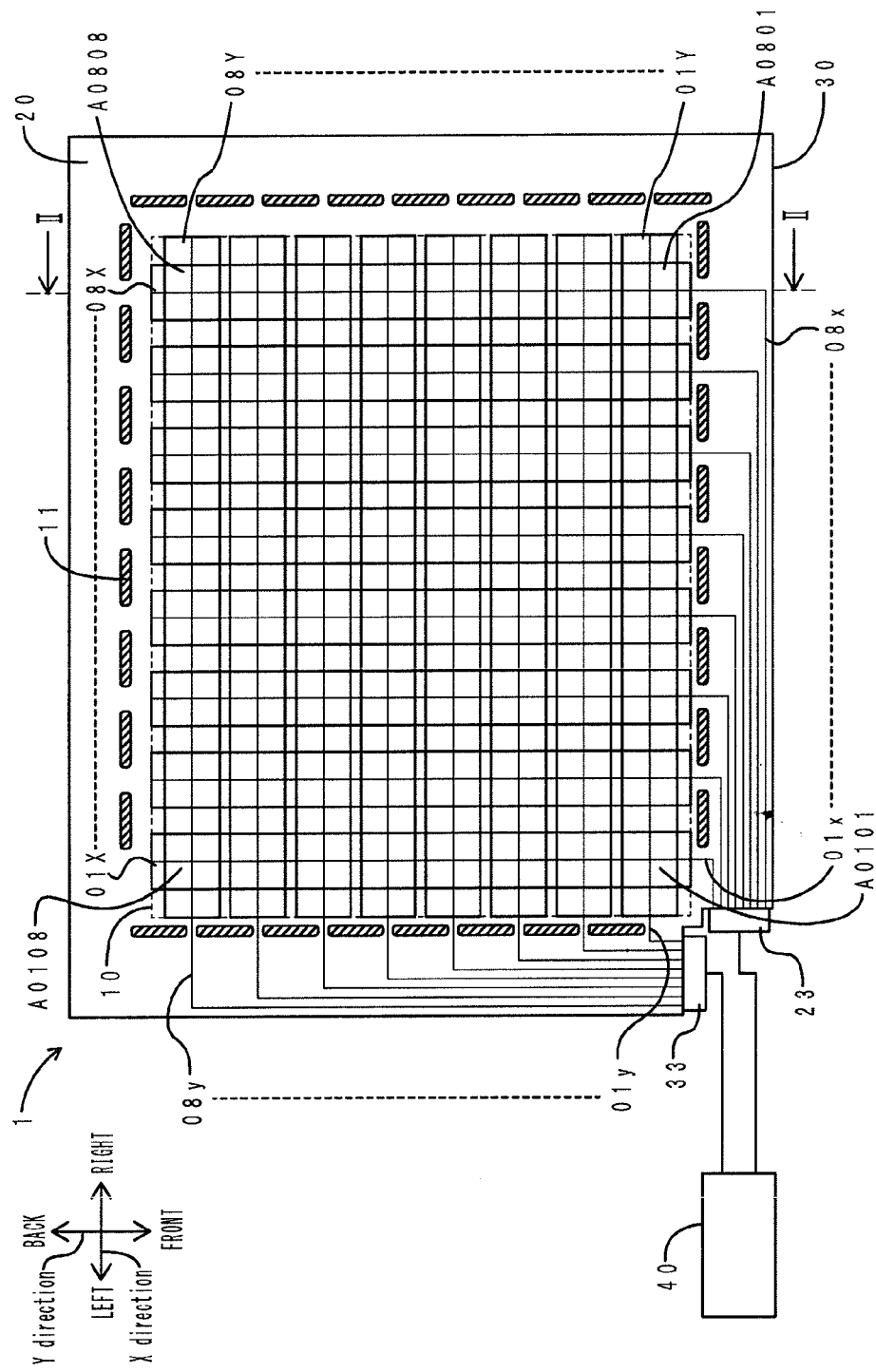
FIG. 1 is a transparent top view of a capacitance type sensor of a first embodiment.
Figure 2:
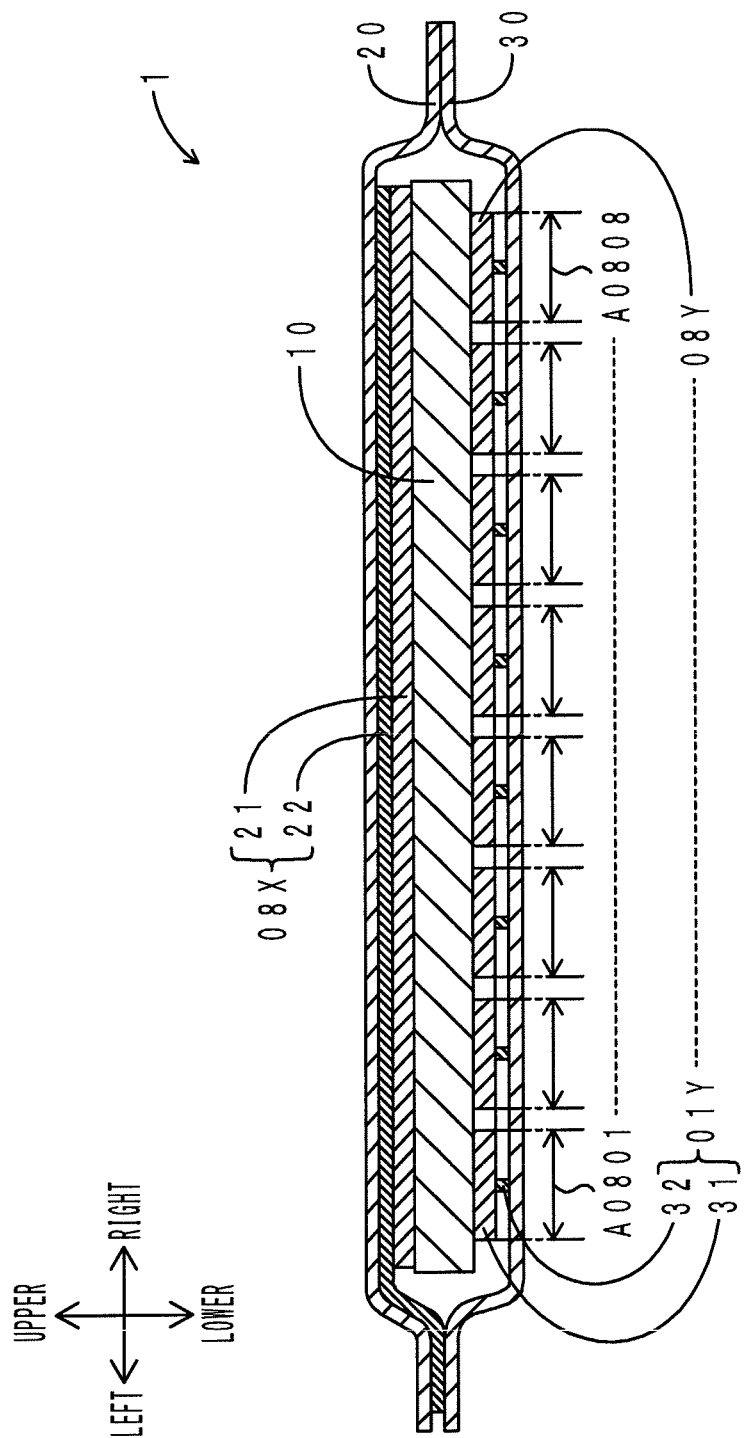
FIG. 2 is a sectional view taken along line II-II in FIG. 1.
Figure 3:
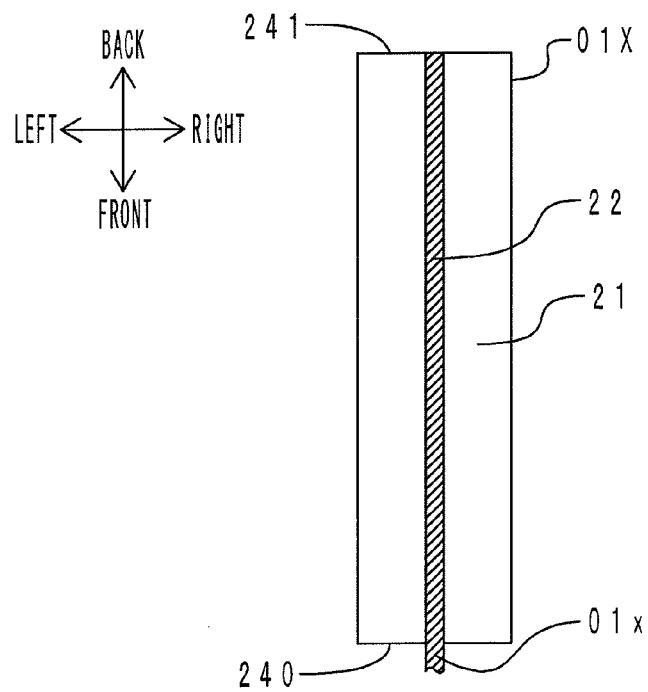
FIG. 3 is a top view of a front-side electrode 01X in the capacitance type sensor.
Figure 4:
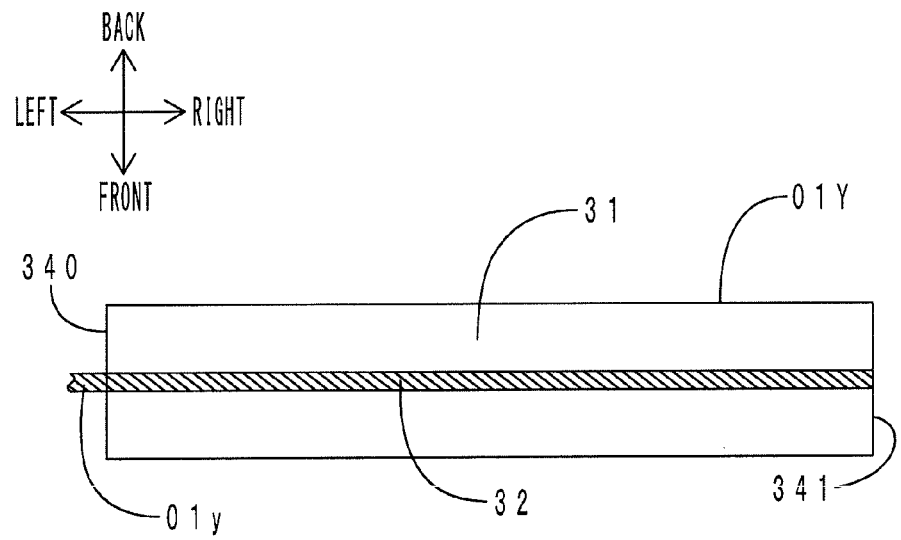
FIG. 4 is a top view of a back-side electrode 01Y in the capacitance type sensor.

First, the configuration of a capacitance type sensor of the present embodiment will be described. FIG. 1 is a transparent top view of the capacitance type sensor of the present embodiment. FIG. 2 is a sectional view taken along line II-II in FIG. 1. FIG. 3 is a top view of a front-side electrode 01X in the capacitance type sensor. FIG. 4 is a top view of a back-side electrode 01Y in the capacitance type sensor. FIG. 1 shows, in a transparent manner, members that are stacked in the front-back direction (thickness direction). Extended wiring portions 22, 32 are shown hatched in FIGS. 3 and 4. As shown in FIGS. 1 and 2, the capacitance type sensor 1 of the present embodiment includes a dielectric layer 10, a front-side sheet 20, a back-side sheet 30, front-side electrodes 01X to 08X, back-side electrodes 01Y to 08Y, detection portions A0101 to A0808, front-side wirings 01x to 08x, back-side wirings 01y to 08y, a front-side connector 23, a back-side connector 33, and an operation section 40. The first two digits "○○" of the reference characters "A○○ΔΔ" of the detection portions correspond to the surface-side electrodes 01X to 08X, and the last two digits "ΔΔ" thereof correspond to the back-side electrodes 01Y to 08Y.

The dielectric layer 10 is made of urethane foam, and is in the shape of a rectangular sheet. The thickness of the dielectric layer 10 is 300 μm. The dielectric layer 10 extends in the X and Y directions (left-right and front-back directions). Urethane foam is included in the "polymer" in the present invention.

The front-side sheet 20 is placed on the upper side (front side) of the dielectric layer 10. The front-side sheet 20 is made of polyethylene terephthalate (PET), and has a rectangular shape. The back-side sheet 30 is placed on the lower side (back side) of the dielectric layer 10. The back-side sheet 30 is made of PET, and has the same rectangular shape as the front-side sheet 20. The front-side sheet 20 and the back-side sheet 30 are stacked with the dielectric layer 10 interposed therebetween.

A total of eight front-side electrodes 01X to 08X are formed on the lower surface (back surface) of the front-side sheet 20. Each of the front-side electrodes 01X to 08X has a strip shape. Each of the front-side electrodes 01X to 08X extends in the Y direction (front-back direction). The front-side electrodes 01X to 08X are arranged at predetermined intervals in the X direction (left-right direction) so as to be substantially parallel to each other.

As an example is shown in FIG. 3, each of the front-side electrodes 01X to 08X has an electrode body 21 and an extended wiring portion 22. The electrode body 21 has a strip shape. The electrode body 21 is placed so as to contact the upper surface of the dielectric layer 10. The electrode body 21 contains a polyester resin and graphite powder. The width (length in the left-right direction) of the electrode body 21 is 10 mm, and the volume resistivity thereof is 0.1 Ω·cm.

The extended wiring portion 22 has a linear pattern connecting a front end 240 of the electrode body 21 and a rear end 241 thereof. The extended wiring portion 22 is placed along the center in the lateral direction of the upper surface (front surface) of the electrode body 21. The extended wiring portion 22 is interposed between the electrode body 21 and the front-side sheet 20. The extended wiring portion 22 contains a polyester resin and silver-coated copper powder. The volume resistivity of the extended wiring portion 22 is $1 \times 10^{-4}$ Ω·cm. The extended wiring portion 22 is made of the same conductive material as the front-side wirings $01x$ to $08x$, and is formed so as to be continuous with a corresponding one of the front-side wirings $01x$ to $08x$. In each of the front-side electrodes 01X to 08X, electrical resistance between the front end 240 and the rear end 241 is 400Ω. The front end 240 is included in the "upstream end" in the present invention, and the rear end 241 is included in the "downstream end" in the present invention.

A total of eight front-side wirings $01x$ to $08x$ are formed on the lower surface of the front-side sheet 20. Each of the front-side wirings $01x$ to $08x$ has a line pattern. Each of the front-side wirings $01x$ to $08x$ contains a polyester resin and silver-coated copper powder. The front-side connector 23 is placed at the left front corner of the front-side sheet 20. The front-side connector 23 is electrically connected to the operation section 40. Each of the front-side wirings $01x$ to $08x$ connects the front end 240 of a corresponding one of the front-side electrodes 01X to 08X and the front-side connector 23.

A total of eight back-side electrodes 01Y to 08Y are formed on the upper surface (front surface) of the back-side sheet 30. Each of the back-side electrodes 01Y to 08Y has a strip shape. Each of the back-side electrodes 01Y to 08Y extends in the X direction (left-right direction). The back-side electrodes 01Y to 08Y are arranged at predetermined intervals in the Y direction (front-back direction) so as to be substantially parallel to each other.

The configuration of the back-side electrodes 01Y to 08Y is the same as that of the front-side electrodes 01X to 08X. That is, as an example is shown in FIG. 4, each of the back-side electrodes 01Y to 08Y has an electrode body 31 and an extended wiring portion 32 (FIG. 4 shows the extended wiring portion 32 in a transparent manner). The electrode body 31 has a strip shape. The electrode body 31 is placed so as to contact the lower surface of the dielectric layer 10. The electrode body 31 contains a polyester resin and graphite powder. The width (length in the front-back direction) of the electrode body 31 is 10 mm, and the volume resistivity thereof is 0.1 Ω·cm.

The extended wiring portion 32 has a linear pattern connecting a left end 340 of the electrode body 31 and a right end 341 thereof. The extended wiring portion 32 is placed along the center in the lateral direction of the lower surface (back surface) of the electrode body 31. The extended wiring portion 32 is interposed between the electrode body 31 and the back-side sheet 30. The extended wiring portion 32 contains a polyester resin and silver-coated copper powder. The volume resistivity of the extended wiring portion 32 is $1 \times 10^{-4}$ Ω·cm. The extended wiring portion 32 is made of the same conductive material as the back-side wirings $01y$ to $08y$, and is formed so as to be continuous with a corresponding one of the back-side wirings $01y$ to $08y$. In each of the back-side electrodes 01Y to 08Y, electrical resistance between the left end 340 and the right end 341 is 400Ω. The left end 340 is included in the "upstream end" in the present invention, and the right end 341 is included in the "downstream end" in the present invention.

A total of eight back-side wirings $01y$ to $08y$ are formed on the lower surface of the back-side sheet 30. Each of the back-side wirings $01y$ to $08y$ has a line pattern. Each of the back-side wirings $01y$ to $08y$ contains a polyester resin and silver-coated copper powder. The back-side connector 33 is placed at the left front corner of the back-side sheet 30. The back-side connector 33 is electrically connected to the operation section 40. Each of the back-side wirings $01y$ to $08y$ connects the left end 340 of a corresponding one of the back-side electrodes 01Y to 08Y and the back-side connector 33.

The front-side sheet 20 and the back-side sheet 30 face each other with the dielectric layer 10 interposed therebetween. A plurality of fused portions 11 are placed in the peripheral edge portions of the front-side sheet 20 and the back-side sheet 30, as shown by hatched regions in FIG. 1. The plurality of fused portions 11 are arranged in the pattern of a dotted line so as to surround the dielectric layer 10. The front-side sheet 20 and the back-side sheet 30 are bonded together in the fused portions 11.

The detection portions A0101 to A0808 are placed at the intersections (overlapping portions) of the front-side electrodes 01X to 08X and the back-side electrodes 01Y to 08Y as viewed in the vertical direction. Each of the detection portions A0101 to A0808 includes a part of a corresponding one of the front-side electrodes 01X to 08X, a part of a corresponding one of the back-side electrodes 01Y to 08Y, and a part of the dielectric layer 10. A total of 64 (eight by eight) detection portions A0101 to A0808 are arranged. The detection portions A0101 to A0808 are arranged at substantially regular intervals on the entire surface of the dielectric layer 10. Surface pressure distribution is detected in a rectangular region enclosing the detection portions A0101 to A0808.

The operation section 40 applies a rectangular wave voltage to the front-side electrodes 01X to 08X and the back-side electrodes 01Y to 08Y. The operation section 40 has an integrating circuit (not shown). The integrating circuit is formed by a resistor, a capacitor, and an operational amplifier. Electric charge generated in the detection portions A0101 to A0808 is integrated in the integrating circuit and changed into a voltage value, and then the voltage value is amplified and output. Capacitance C is calculated from the output voltage value.

[Manufacturing Method of Capacitance Type Sensor]

Next, a manufacturing method of the capacitance type sensor 1 of the present embodiment will be described. The manufacturing method of the capacitance type sensor 1 of the present embodiment has a printing step, a stacking step, and a sheet fusing step.

In the printing step, the front-side electrodes 01X to 08X and the front-side wirings 01x to 08x are formed on the front-side sheet 20. Similarly, the back-side electrodes 01Y to 08Y and the back-side wirings 01y to 08y are formed on the back-side sheet 30. First, first conductive paint is prepared which is to be used to form the extended wiring portions 22 of the front-side electrodes 01X to 08X, the front-side wirings 01x to 08x, the extended wiring portions 32 of the back-side electrodes 01Y to 08Y, and the back-side wirings 01y to 08y. Second conductive paint is also prepared which is to be used to form the electrode bodies 21 of the front-side electrodes 01X to 08X and the electrode bodies 31 of the back-side electrodes 01Y to 08Y.

The prepared first conductive paint is printed on the lower surface (the lower surface in FIG. 2, which is placed so as to face upward when being printed) of the front-side sheet 20 by using a screen printing machine. The coating film is cured by heating to form the eight extended wiring portions 22 and the eight front wirings 01x to 08x. Thereafter, the prepared second conductive paint is printed so as to cover each of the formed extended wiring portions 22 by using a screen printing machine. The coating film is cured by heating to form the eight electrode bodies 21. The front-side electrodes 01X to 08X and the front-side wirings 01x to 08x are thus formed on the front-side sheet 20.

Similarly, the first conductive paint is printed on the upper surface of the back-side sheet 30 to form the eight extended wiring portions 32 and the back-side wirings 01y to 08y. The second conductive paint is also printed thereon to form the eight electrode bodies 31. The back-side electrodes 01Y to 08Y and the back-side wirings 01y to 08y are thus formed on the back-side sheet 30.

In the stacking step, the back-side sheet 30, the dielectric layer 10, and the front-side sheet 20 are stacked in this order from the bottom. That is, the back-side sheet 30, the dielectric layer 10, and the front-side sheet 20 are stacked so that the dielectric layer 10 is interposed between the back-side electrodes 01Y to 08Y formed on the back-side sheet 30 and the front-side electrodes 01X to 08X formed on the front-side sheet 20.

In the sheet fusing step, the peripheral edge portions of the front-side sheet 20 and the back-side sheet 30 that have been stacked are spot-fused at predetermined intervals (see the fused portions 11 in FIG. 1). Lastly, the front-side wirings 01x to 08x are connected to the front-side connector 23, and the rear-side wirings 01y to 08y are connected to the back-side connector 33. The capacitance type sensor 1 of the present embodiment is thus manufactured.

[Operation of Capacitance Type Sensor]

Operation of the capacitance type sensor 1 of the present embodiment will be described below. In the capacitance type sensor 1, an electric charge method is used as a capacitance measuring method. First, before a load is applied to the capacitance type sensor 1 (initial state), a rectangular wave voltage is applied from the operation section 40 to the front-side electrodes 01X to 08X and the back-side electrodes 01Y to 08Y, and capacitance C is calculated for each detection portion A0101 to A0808. That is, the capacitance C is calculated as if the detection portions were scanned from the detection portion A0101 to the detection portion A0808. Subsequently, after the load is applied to the capacitance type sensor 1, the capacitance C is similarly calculated for each detection portions A0101 to A0808. The distance between the front-side electrode and the back-side electrode is reduced in the detection portion corresponding to the part subjected to the load. The capacitance C of this detection portion is therefore increased. A surface pressure for each detection portion A0101 to A0808 is calculated from this amount of change ΔC in capacitance C.

[Functions and Effects]

Functions and effects of the capacitance type sensor 1 of the present embodiment will be described. According to the capacitance type sensor 1 of the present embodiment, each of the front-side electrodes 01X to 08X has the electrode body 21 and the extended wiring portion 22. Similarly, each of the back-side electrodes 01Y to 08Y has the electrode body 31 and the extended wiring portion 32. This can suppress an increase in electrical resistance in the longitudinal direction of the electrodes and can reduce the overall electrical resistance of the electrodes, as compared to the case where each of the front-side electrodes 01X to 08X and the back-side electrodes 01Y to 08Y is formed by the electrode body 21, 31 only. Specifically, in each of the front-side electrodes 01X to 08X, the electrical resistance between the front end 240 and the rear end 241 is 400Ω. In each of the back-side electrodes 01Y to 08Y, the electrical resistance between the left end 340 and the right end 341 is 400Ω. The capacitance therefore does not vary so much depending on the position of the detection portion. Accordingly, the capacitance type sensor 1 has high measurement accuracy of surface pressure distribution.

The conductive material of the electrode bodies 21, 31 is graphite powder. According to the capacitance type sensor 1, even if relatively inexpensive graphite powder is used, highly conductive electrodes in which electrical resistance does not increase so much in the longitudinal direction can be implemented by stacking the extended wiring portions 22, 32 on the electrode bodies 21, 31. The volume resistivity of the electrode bodies 21, 31 is 0.1 Ω·cm. Since the volume resistivity of the electrode bodies 21, 31 is relatively low, an increase in electrical resistance in the lateral direction of the electrode bodies 21, 31 need not be considered. Accordingly, the overall electrical resistance of the electrodes can be reduced by merely forming one extended wiring portion 22, 32 having a smaller width than the electrode body 21, 31 in a linear pattern extending in the longitudinal direction of the electrode body 21, 31.

The extended wiring portions 22, 32, the front-side wirings 01x to 08x, and the back-side wiring 01y to 08y are made of the same material. The extended wiring portions 22 are formed so as to be continuous with the front-side wirings 01x to 08x by a screen printing method. Similarly, the extended wiring portions 32 are formed so as to be continuous with the back-side wirings 01y to 08y by a screen printing method. The extended wiring portions 22, 32 can thus be easily formed by merely extending the front-side wirings 01x to 08x and the back-side wirings 01y to 08y in the longitudinal direction of the electrode bodies 21, 31. The electrode bodies 21, 31 are also formed by a screen printing method. By the screen printing method, electrodes and wirings can be easily formed even if the electrodes and the wirings are thin wires or thin films or have a large area.

The silver-coated copper powder as the conductive material of the extended wiring portions 22, 32 has lower volume resistivity, and is also inexpensive as compared to silver powder. The extended wiring portions 22, 32 have a thin linear pattern. That is, the area of the extended wiring portions 22, 32 is smaller than that of the electrode bodies 21, 31. This can reduce the amount of silver-coated copper powder to be used. Accordingly, cost can be reduced, and more inexpensive electrodes and thus a more inexpensive capacitance type sensor 1 can be implemented.

The electrode bodies 21, 31 use a polyester resin as a binder. Polyester resins are less likely to lose resilience and has higher whether resistance and higher printing characteristics as compared to elastomers. The use of polyester resins can reduce a change in electrical resistance of the electrode bodies 21, 31 with time. Moreover, polyester resins have relatively low oxygen permeability, and therefore have a high protective effect of the extended wiring portions 22, 32. That is, the extended wiring portion 22 is interposed between the electrode body 21 and the front-side sheet 20. Similarly, the extended wiring portion 32 is interposed between the electrode body 31 and the back-side sheet 30. The front-side sheet 20 and the back-side sheet 30 are made of PET. The front-side sheet 20 and the back-side sheet 30 also have relatively low oxygen permeability. The silver-coated copper powder contained in the extended wiring portions 22, 32 is therefore less likely to be oxidized. Accordingly, conductive properties of the extended wiring portions 22, 32 are less likely to be degraded even after a long period of use. Therefore, the front-side electrodes 01X to 08X and the back-side electrodes 01Y to 08Y have high durability.

The capacitance type sensor 1 is manufactured by stacking the front-side sheet 20 and the back-side sheet 30, each having both the electrodes and the wirings printed thereon, with the dielectric layer 10 being interposed therebetween. Accordingly, the capacitance type sensor 1 can be easily manufactured. Moreover, urethane foam on which electrodes cannot be easily and directly printed can be used as the dielectric layer 10. According to the capacitance type sensor 1, a load is mainly detected based on a change in capacitance according to a change in distance between the electrodes (the thickness of the detection portion A0101 to 0808). Therefore, even a relatively small load can easily be detected.

In the capacitance type sensor 1, capacitance is measured by an electric charge method. As described above, since the electrodes have low electrical resistance, the amount of electric charge does not vary so much depending on the position of the detection portion. The capacitance type sensor 1 therefore has high measurement accuracy of surface pressure distribution.

Second to Sixth Embodiments

Capacitance type sensors of second to sixth embodiments are different from the capacitance type sensor of the first embodiment in the pattern of the extended wiring portions 22, 23 in the front-side electrodes 01X to 08X and the back-side electrodes 01Y to 08Y. Accordingly, only the differences will be described below. In each of the second to sixth embodiments, the front-side electrodes 01X to 08X and the back-side electrodes 01Y to 08Y have the same structure. Accordingly, only the front-side electrode 01X will be described.

Figure 5:
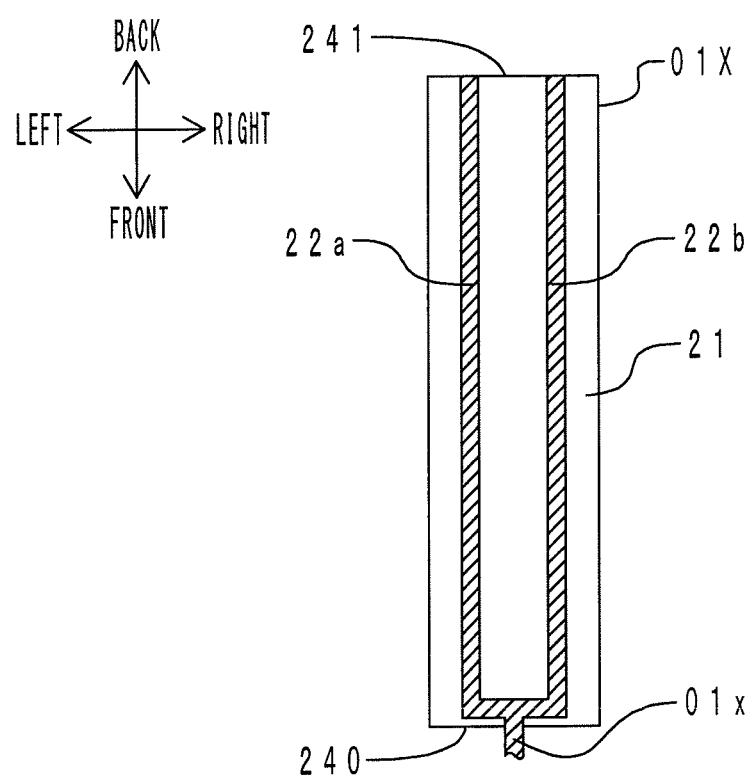
FIG. 5 is a top view of a front-side electrode 01X in a capacitance type sensor of a second embodiment.

FIG. 5 is a top view of the front-side electrode 01X in the capacitance type sensor of the second embodiment. The extended wiring portions are shown hatched in FIG. 5 (the same applies to FIGS. 6 to 9). As shown in FIG. 5, the front-side electrode 01X has the electrode body 21 and two extended wiring portions 22a, 22b. Each of the extended wiring portions 22a, 22b has a linear pattern extending from the front end 240 of the electrode body 21 to the rear end 241 thereof. The extended wiring portions 22a, 22b are placed on the upper surface of the electrode body 21 so as to be separated from each other in the lateral direction (left-right direction) and parallel to each other. The extended wiring portions 22a, 22b are formed so as to be continuous with the front-side wiring 01x. According to the present embodiment, the overall electrical resistance of the front-side electrode 01X can further be reduced.

Figure 6:
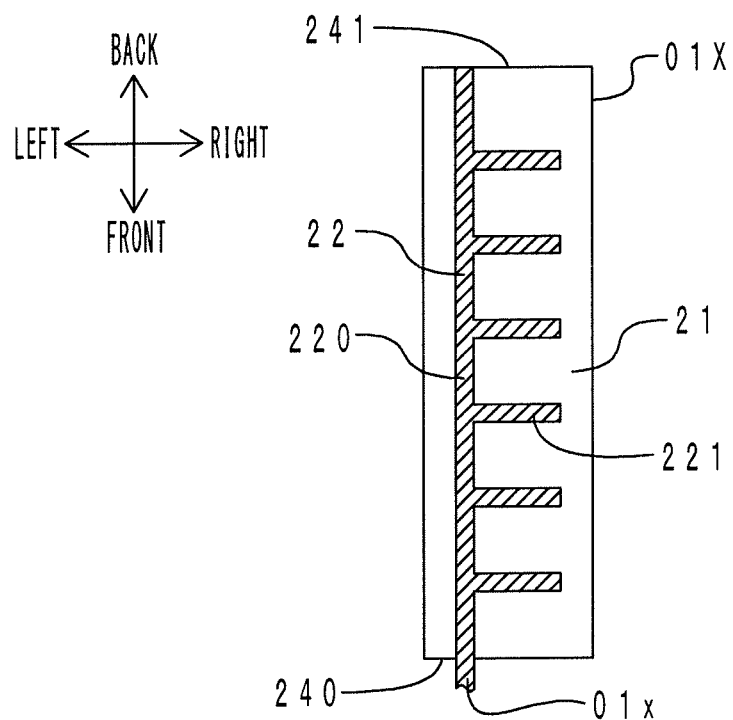
FIG. 6 is a top view of a front-side electrode 01X in a capacitance type sensor of a third embodiment.

FIG. 6 is a top view of the front-side electrode 01X in the capacitance type sensor of the third embodiment. As shown in FIG. 6, the extended wiring portion 22 is formed by a trunk portion 220 and six branch portions 221. The trunk portion 220 has a linear pattern extending from the front end 240 of the electrode body 21 to the rear end 241 thereof. The trunk portion 220 is placed on the left part of the upper surface of the electrode body 21. Each of the six branch portions 221 is placed so as to branch off rightward from the trunk portion 220. The six branch portions 221 are arranged at regular intervals in the front-back direction so as to be substantially parallel to each other. The extended wiring portion 22 is formed so as to be continuous with the front-side wiring 01x. According to the present embodiment, the overall electrical resistance of the front-side electrode 01X can further be reduced.

Figure 7:
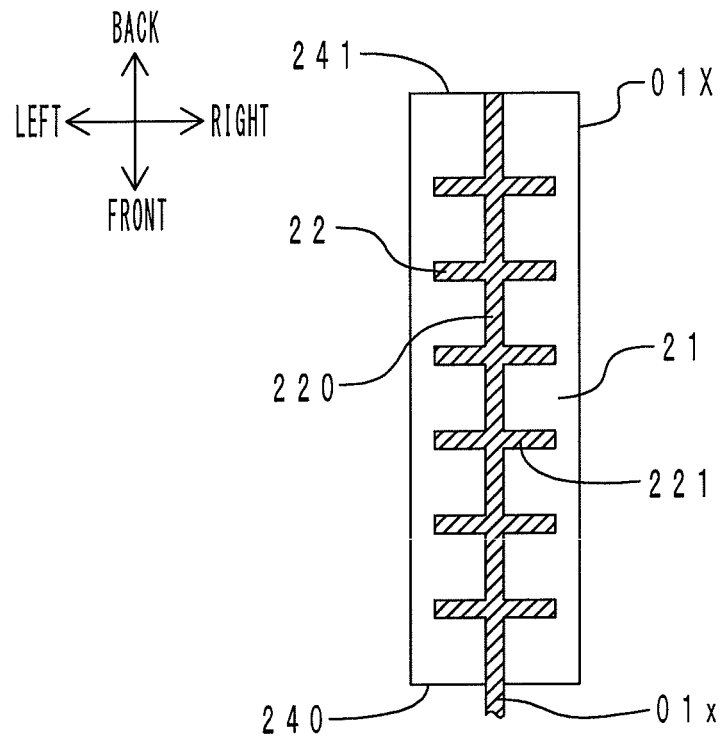
FIG. 7 is a top view of a front-side electrode 01X in a capacitance type sensor of a fourth embodiment.

FIG. 7 is a top view of the front-side electrode 01X in the capacitance type sensor of the fourth embodiment. As shown in FIG. 7, the extended wiring portion 22 is formed by a trunk portion 220 and six branch portions 221. The trunk portion 220 has a linear pattern extending from the front end 240 of the electrode body 21 to the rear end 241 thereof. The trunk portion 220 is placed along the center in the lateral direction of the upper surface of the electrode body 21. Each of the six branch portions 221 is placed so as to branch off both rightward and leftward from the trunk portion 220. The six branch portions 221 are arranged at regular intervals in the front-back direction so as to be substantially parallel to each other. The extended wiring portion 22 is formed so as to be continuous with the front-side wiring 01x. According to the present embodiment, the overall electrical resistance of the front-side electrode 01X can further be reduced.

Figure 8:
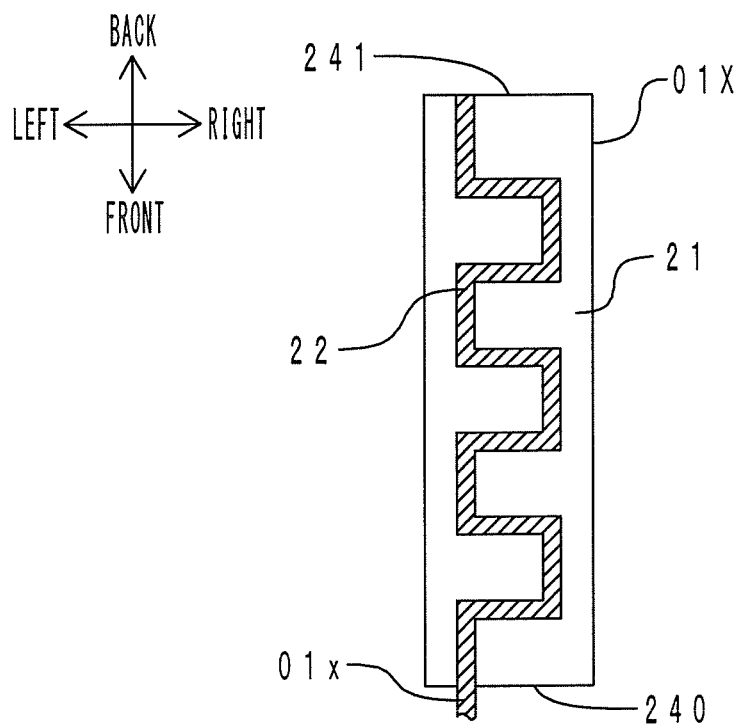
FIG. 8 is a top view of a front-side electrode 01X in a capacitance type sensor of a fifth embodiment.

FIG. 8 is a top view of the front-side electrode 01X in the capacitance type sensor of the fifth embodiment. As shown in FIG. 8, the extended wiring portion 22 has a rectangular wave pattern from the front end 240 of the electrode body 21 toward the rear end 241 thereof. According to the present embodiment, the overall electrical resistance of the front-side electrode 01X can further be reduced.

Figure 9:
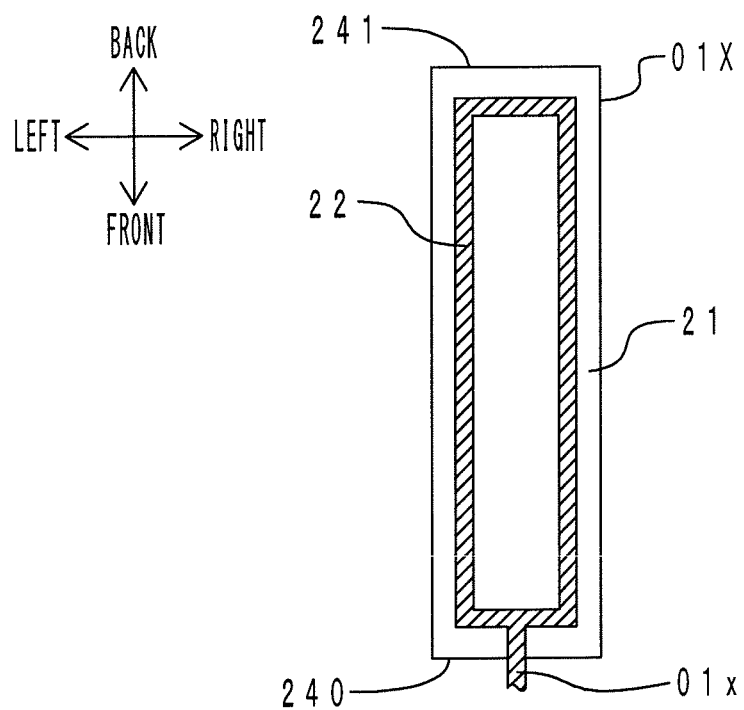
FIG. 9 is a top view of a front-side electrode 01X in a capacitance type sensor of a sixth embodiment.

FIG. 9 is a top view of the front-side electrode 01X in the capacitance type sensor of the sixth embodiment. As shown in FIG. 9, the extended wiring portion 22 has a frame pattern. The extended wiring portion 22 is placed along the peripheral edge of the electrode body 21. According to the present embodiment, the overall electrical resistance of the front-side electrode 01X can further be reduced.

<Others>

The embodiments of the capacitance type sensor of the present invention are described above. However, embodiments are not limited to the above embodiments, and various modification and improvements can be made by those skilled in the art.

The type of binder that forms the electrode bodies and the extended wiring portions (electrodes) and the wirings is not particularly limited. The binder may be selected as appropriate from resins and elastomers. Although a polyester resin is used as the binder for all of the electrode bodies and the extended wiring portions (electrodes) and the wirings, different binders may be used for each member. Examples of the resins other than the polyester resin include an epoxy resin, a modified polyester resin (urethane modified polyester resin, epoxy modified polyester resin, acrylic modified polyester resin, etc.), a polyether urethane resin, a polycarbonate urethane resin, a vinyl chloride-vinyl acetate copolymer, a phenol resin, an acrylic resin, a polyamide imide resin, a polyimide resin, a polyamide resin, nitrocellulose, and modified celluloses (cellulose acetate butyrate (CAB), cellulose acetate propionate (CAP), etc.). Examples of the elastomers include silicone rubber, ethylene-propylene copolymer rubber, natural rubber, styrene-butadiene copolymer rubber, acrylonitrile-butadiene copolymer rubber, acrylic rubber, epichlorohydrin rubber, chlorosulfonated polyethylene, chlorinated polyethylene, and urethane rubber.

The type of conductive material is not particularly limited. The conductive material may be selected as appropriate from conductive carbon powder such as carbon black and graphite powder and metal powder such as silver and copper, in view of the conductive properties of the electrodes and wirings, cost, etc. The electrodes and the wirings may contain various additives in addition to the binder and the conductive material. Examples of the additives include a curing agent, a cross-linking agent, a vulcanization accelerator, a vulcanization aid, an anti-aging agent, a plasticizer, a softener, a coloring agent, a dispersing agent, a coupling agent, a leveling agent, and an antifoaming agent.

The volume resistivity of the electrode body is not particularly limited. However, it is desirable that the volume resistivity of the electrode body be $1 \times 10^1$ $\Omega \cdot cm$ or less in order that electrical resistance is reduced. The volume resistivity of the extended wiring portion need only be lower than that of the electrode body, and is desirably, e.g., $1 \times 10^{-3}$ $\Omega \cdot cm$ or less. In the above embodiments, the electrical resistance between the upstream end and the downstream end is $400\Omega$ in the electrode having a width of 10 mm. Preferred electrical resistance between the upstream and downstream ends of the electrode can be determined as appropriate according to the electrode width. For example, if the electrode width is 10 mm or more, it is desirable that the electrical resistance between the upstream and downstream ends of the electrode be $3,000\Omega$ or less.

The pattern of the extended wiring portion is not particularly limited as long as an increase in electrical resistance in the longitudinal direction of the electrode can be suppressed. That is, the extended wiring portion need only be placed so that the electrical resistance between the upper and lower ends of the electrode is smaller than that of the electrode body. For example, the extended wiring portion may be placed so as to cover the entire surface of the electrode body. However, it is desirable that the area of the extended wiring portion be smaller than that of the electrode body in order that cost is reduced. The extended wiring portion may be placed in a curved pattern, a meandering pattern, a zigzag pattern, etc. in addition to the above embodiments. In the capacitance type sensor of the above embodiments, the pattern of the extended wiring portion may be different between the front-side electrode and the back-side electrode.

The shape of the electrode body is not particularly limited as long as the electric body has an elongated shape. The width of the electrode body may not be constant in the longitudinal direction. For example, the electrode body may have a larger width in a predetermined portion in the longitudinal direction, or may have a smaller width in a predetermined portion in the longitudinal direction. The side portions of the electrode body may have either a linear shape or a curved shape. The number of electrodes, the interval between adjoining electrodes, etc. are not limited to the above embodiments.

In the above embodiments, the extended wiring portions and the wirings are made of the same conductive material such that the extended wiring portions are continuous with the wirings. However, the extended wiring portions and the wirings may be made of different conductive materials. The electrodes and the wirings may be formed by a method other than the screen printing, such as ink jet printing, flexo printing, gravure printing, pad printing, or lithography. Alternatively, the electrodes and the wirings may be formed by a dip method, a spray method, a barcode method, etc.

The capacitance measurement method is not limited to the electric charge method. For example, an impedance method may be used.

An elastomer or resin can be used as the dielectric layer. For example, an elastomer or resin having a high specific dielectric constant is desirable in order that capacitance is increased. Specifically, it is desirable to use an elastomer or resin having a specific dielectric constant of 3 or more, and more desirably 5 or more, at normal temperature. A preferred example is an elastomer having a polar functional group such as an ester group, a carboxyl group, a hydroxyl group, a halogen group, an amide group, a sulfone group, a urethane group, or a nitrile group, or an elastomer containing a polar low molecular weight compound having such a polar functional group. The elastomer may be cross-linked or may not be cross-linked. The detection sensitivity and detected range of the capacitance type sensor can be adjusted by adjusting Young's modulus of the elastomer or resin that is used for the dielectric layer. For example, foam having a small Young's modulus is used in the case of detecting a small load.

Preferred examples of the elastomer include silicone rubber, acrylonitrile-butadiene copolymer rubber, acrylic rubber, epichlorohydrin rubber, chlorosulfonated polyethylene, chlorinated polyethylene, and urethane rubber. Preferred examples of the resin include polyethylene, polypropylene, polyurethane, polystyrene (including cross-linked polystyrene foam), polyvinyl chloride, a vinylidene chloride copolymer, and an ethylene-vinyl acetate copolymer. Polypropylene (modified PP) modified by polyethylene (PE) and/or ethylene-propylene rubber (EPR) may be used as polypropylene. A polymer alloy or polymer blend containing two or more kinds of these resins may be used.

The material of the front-side sheet and the back-side sheet is not particularly limited. A resin film with flexibility, which is made of polyimide, polyethylene, polyethylene naphthalate (PEN), etc., may be used in addition to PET in the above embodiments. Instead of forming the front-side sheet and the back-side sheet, the electrodes and the wirings may be formed directly on both the front and back surfaces of the dielectric layer. In this case, it is desirable to interpose the dielectric layer between insulating cover sheets so that the exposed electrodes and wirings are covered.

The invention claimed is:

1. A capacitance type sensor, comprising:
   a dielectric layer made of a polymer;
   an elongated front-side electrode placed on a front side of the dielectric layer;
   an elongated back-side electrode placed on a back side of the dielectric layer;

a front-side wiring connected to the front-side electrode;
a back-side wiring connected to the back-side electrode; and
a plurality of detection portions formed between the front-side electrode and the back-side electrode which face each other in a front-back direction,
the capacitance type sensor being capable of detecting surface pressure distribution based on a change in capacitance of a detection portion, characterized in that
each of the front-side electrode and the back-side electrode has an elongated electrode body containing a binder and a conductive material, and an extended wiring portion extending in a longitudinal direction of the electrode body and having lower volume resistivity than the electrode body, and
the front-side wiring and the back-side wiring have lower volume resistivity than the electrode body.

2. The capacitance type sensor according to claim 1, wherein
the extended wiring portion of the front-side electrode and the front-side wiring are made of the same material such that the extended wiring portion of the front-side electrode is continuous with the front-side wiring, and
the extended wiring portion of the back-side electrode and the back-side wiring are made of the same material such that the extended wiring portion of the back-side electrode is continuous with the back-side wiring.

3. The capacitance type sensor according to claim 1, wherein
the binder of the electrode body is a resin.

4. The capacitance type sensor according to claim 1, wherein
the volume resistivity of the electrode body is $1 \times 10^1$ Ω·cm or less.

5. The capacitance type sensor according to claim 1, wherein
the extended wiring portion contains a binder and a metal powder.

6. The capacitance type sensor according to claim 1, wherein
in each of the front-side electrode and the back-side electrode, electrical resistance between an upstream end to which the front-side wiring or the back-side wiring is connected and a downstream end as a longitudinal terminal end is 3,000Ω or less.

7. The capacitance type sensor according to claim 1, wherein
the extended wiring portion has a smaller area than the electrode body.

8. The capacitance type sensor according to claim 1, wherein
the electrode body and the extended wiring portion are printed.

9. The capacitance type sensor according to claim 1, further comprising:
a pair of front-side and back-side sheets that are placed with the dielectric layer interposed therebetween,
the front-side electrode is formed on a back surface of the front-side sheet which contacts the dielectric layer, and the extended wiring portion of the front-side electrode is interposed between the electrode body and the front-side sheet, and
the back-side electrode is formed on a front surface of the back-side sheet which contacts the dielectric layer, and the extended wiring portion of the back-side electrode is interposed between the electrode body and the back-side sheet.

\* \* \* \* \*